United States Patent [19]
Adams et al.

[11] Patent Number: 5,916,931
[45] Date of Patent: Jun. 29, 1999

[54] TIRE INFLATING AND PUNCTURE SEALING COMPOSITION

[75] Inventors: Lawrence J. Adams, Ponte Vedra Beach; Paul D. Hughett, Jacksonville, both of Fla.

[73] Assignee: Engine Fog Inc., Jacksonville, Fla.

[21] Appl. No.: 08/860,341

[22] PCT Filed: Dec. 11, 1995

[86] PCT No.: PCT/US95/16063

§ 371 Date: Aug. 25, 1997

§ 102(e) Date: Aug. 25, 1997

[87] PCT Pub. No.: WO96/17898

PCT Pub. Date: Jun. 13, 1996

[51] Int. Cl.⁶ .................................................. C08J 9/30
[52] U.S. Cl. ................ 523/166; 524/35; 524/375; 524/565; 524/566; 524/903; 252/305; 252/DIG. 1
[58] Field of Search ............................... 523/166; 524/35, 524/375, 565, 566, 903; 252/305, DIG. 1

[56] References Cited

U.S. PATENT DOCUMENTS

| 4,439,342 | 3/1984 | Albanese | 524/903 |
| 4,501,825 | 2/1985 | Magyar et al. | 521/78 |

FOREIGN PATENT DOCUMENTS

| 0140704 | 12/1978 | Japan | 523/166 |

*Primary Examiner*—Andrew E.C. Merriam
*Attorney, Agent, or Firm*—Lieberman & Nowak, LLP

[57] ABSTRACT

An aerosol propellant for sealing punctures in tires comprises a methylene chloride-in-water emulsion comprising water, methylene chloride, a curable acrylonitrile-butadiene-styrene (ABS) polymer latex and a surfactant, the emulsion having been blended with a fibrous plugging/matting agent, a carbon dioxide containing propellant or propellant blend in an amount sufficient to at least partially inflate a tire, and a corrosion inhibitor. The tire inflator/sealer provides an ozone friendly product.

15 Claims, No Drawings

TIRE INFLATING AND PUNCTURE SEALING COMPOSITION

FIELD OF THE INVENTION

The invention broadly concerns a new aerosol propellant composition which can be non-flammable, non-explosive, and environmentally inoffensive and a composition for sealing and inflating a punctured pneumatic tire which employs the new aerosol propellant.

BACKGROUND ART

Changing a flat tire on an automobile is generally regarded by consumers as a troublesome chore at best, and, if the flat occurs in certain locations or weather conditions, can be perceived to be a dangerous undertaking. Consequently, aerosol tire sealants and inflators packaged in aerosol containers suitable for carrying in an automobile have gained wide acceptance by consumers.

A conventional tire sealer and inflator composition is disclosed in U.S. Pat. No. 5,338,776 to Peelor et al. The composition of the patent employs two components: a sealing component consisting of an acrylic resin dissolved in a solvent and a propellant component based on a hydrochlorofluorocarbon or a hydrofluorocarbon compound. The composition of the patent is characterized in the patent as anhydrous. Ten solvents are specifically identified in the patent at column 4, lines 39 through 55 as being suitable for the tire sealer and inflator composition of the patent. With exception of methylene chloride, each of the solvents specifically identified has been classified by the State of California as an atmosphere polluting volatile organic compound ("VOC") and its release into the atmosphere is discouraged. Methylene chloride in the liquid state, although not classified as an atmosphere polluting VOC, tends to attack rubber compounds by solubilizing them. Introduction of liquid methylene chloride into the cavity of a pneumatic tire would be expected to have an adverse effect on the rubber compounds of the tire. Although the inside wall surfaces of certain tires have a polymer-membrane liner which may provide some protection against methylene chloride, additional protection would be desirable were methylene chloride to be used as a solvent in a tire sealer and inflator composition.

It would be desirable to use a nonflammable, environmentally inoffensive, essentially inert gas such as air, nitrogen ($N_2$), carbon dioxide ($CO_2$), or helium (He) as a propellant/inflating agent for an aerosol tire sealer and inflator. However, typical aerosol containers—designated "2Q" containers—can be pressurized to a pressure of no greater than 180 psig at 130° F., a limit imposed by the United States Department of Transportation for interstate shipping of such containers. Moreover, as a practical matter, aerosol containers can be no larger than about one liter in capacity. A one liter vessel containing only an inert gas in a quantity just sufficient to meet the pressurization limit of 180 psig at 130° F. would not contain sufficient gas to pressurize a conventional pneumatic automobile tire to a driveable condition.

Solvents are known which can dissolve sufficient carbon dioxide at a pressure safely contained by ordinary aerosol containers to pressurize a flat tire to a driveable condition. Certain of such carbon-dioxide solvents have vapor pressures of at least roughly 100 mm Hg at about 70° F. and thus could contribute to the pressurization of a tire. Among such low-vapor-pressure carbon-dioxide solvents are furan, tetrahydrofuran, acetonitrile, acetone, methylal, methylene chloride, and 1,1-dichloro-1-fluoroethane. Of the compounds listed, furan, tetrahydrofuran, acetonitrile, acetone, and methylal are flammable and potentially explosive in an air pressurized tire. The solubility of carbon dioxide in 1,1-dichloro-1-fluoroethane is considerably less than the other compounds listed. Moreover, 1,1-dichloro-1-fluoroethane has been classified as an atmosphere polluting volatile organic compound by the State of California and is relatively expensive to manufacture, which prohibits the use of substantial quantities of the compound in an aerosol container. As noted above, methylene chloride has a high solubility parameter with respect to rubber compounds and has the potential in the liquid state to soften or degrade the rubber compounds of rubber tires.

A need exists for an effective and inexpensive tire sealant and inflating composition which is essentially nonflammable, essentially nonexplosive, and essentially non-stratospheric-ozone depleting and which does not contribute unduly to global warming and does not contain high levels of atmosphere polluting volatile organic compounds.

SUMMARY OF INVENTION

We have invented a method to solubilize a propellant gas into a methylene-chloride containing carrier to form an aerosol propellant composition which provides effective shielding tending to prevent liquid methylene chloride from attacking surfaces in which the composition may be in contact. Such an aerosol propellant composition employing a nonflammable propellant gas such as carbon dioxide or sulfur hexafluoride can be used as a component of a composition for sealing and inflating a punctured tire which permits a sufficient quantity of the propellant gas to be introduced into the cavity of the tire to inflate the tire to a driveable condition while effectively shielding rubber-compound interior surfaces of the tire cavity from attack by liquid methylene chloride.

Broadly, in a first aspect, the invention concerns an aerosol propellant which comprises a methylene-chloride-in-water; i.e., water/out; emulsion including water, methylene chloride, and a surfactant and a propellant gas soluble in methylene chloride. For many applications, it is preferred that the propellant gas be nonflammable. Preferably, the propellant is gaseous at conventional aerosol pressures and temperatures. Carbon dioxide and sulfur hexafluoride are preferred nonflammable propellant gases, with carbon dioxide being particularly preferred for reasons of economy and because sulfur hexafluoride has a high global-warming potential.

In another aspect, the invention concerns a puncture sealing and inflating composition for pneumatic tires which comprises a water/out emulsion comprising water, methylene chloride, and a surfactant and a nonflammable propellant gas soluble in methylene chloride. The puncture sealing and inhibiting composition also includes a latex emulsion and a fibrous plugging/matting agent.

Preferably, the nonflammable propellant gas of the puncture sealing and inflating composition of the invention is carbon dioxide, sulfur hexafluoride, or a mixture of carbon dioxide and sulfur hexafluoride. Most preferably, the propellant gas is carbon dioxide.

Preferably, the surfactant of the aerosol propellant and the tire sealing and inflating composition has a hydrophilic-to-lipophilic balance in the direction of greater water solubility than oil solubility.

In the preferred embodiments of the puncture sealing and inflating composition of the invention, the latex emulsion is a synthetic nitrile latex emulsion such as an ABS polymer latex emulsion.

A preferred fibrous plugging/matting agent of the puncture sealing and inflating composition of the invention is a fibrous cellulosic material. A particularly preferred fibrous cellulosic plugging/matting agent is an α-cellulose fiber filter aid.

Preferably the tire inflating and puncture sealing composition of the invention includes a corrosion inhibitor.

For the tire sealing and inflating composition of the invention, a blend of nonionic and anionic surfactants is preferred. A particularly preferred surfactant blend for tire sealing and inflating compositions of the invention includes a blend of an octylphenoxypoly(ethyleneoxy)ethanol and an amine salt of an alkyl aryl sulfonate. Such particularly preferred surfactant blends are used in stabilizing preferred synthetic nitrile latex emulsions.

In preferred embodiments of the tire sealing and inflating composition of the invention, the water/out emulsion is highly stable. In particular, the emulsion does not tend to reverse or partially reverse when subjected to the stress of temperature extremes and mechanical force encountered in filling an aerosol container with the composition, storing the composition in the aerosol container in an automotive vehicle under summer and winter temperature conditions, and transporting the composition within a tire cavity after inflating the tire with the composition as the vehicle is driven about. The surfactants, the latex emulsion, and the fibrous plugging/matting agent are believed to contribute to the stability of the water/out emulsion of preferred embodiments of the puncture sealing and tire inflating composition of the, invention.

The methylene-chloride water emulsions of the preferred embodiments of the invention tend to be macroemulsions. Preferred emulsions of the invention have remained at ambient temperatures undisturbed in an emulsified state for two years without phase separation. Moreover, preferred methylene-chloride-in-water emulsions of the invention are stable over a wide range of mechanical and environmental stress such as are encountered in the interior of a automotive vehicle tire. Such methylene-chloride-in-water emulsions enable carbon dioxide to be dissolved in the methylene chloride of the emulsion while effectively tending to shield the rubber of a tire containing the emulsion from deleterious contact with liquid methylene chloride.

In a further aspect, the invention concerns a tire inflating and puncture sealing composition for pneumatic tires which employs a propellant gas and methylene chloride for dissolving the propellant gas to an extent sufficient to permit the composition to be stored safely in a conventional aerosol container while providing sufficient pressure to discharge the composition from the container into a deflated tire and inflate the tire to a desirable condition. The composition includes a protective-coating forming polymer which is only partially or weakly soluble in methylene chloride. Upon introduction into the cavity of a tire, the protective-coating forming polymer tends to "plate out" from the composition and form a protective coating on inner wall surfaces of the tire. The protective coating tends to protect the tire from attack by methylene chloride. Generally, the protective coating tends to allow the methylene chloride to diffuse slowly through the coating and rubber compounds of the tire so that, over a period of two to three months or so, the methylene chloride escapes from the tire interior. The concentrations of methylene chloride at the surface of the rubber compounds and within the rubber compounds is extremely low as the methylene chloride diffuses through the protective coating and the tire so that the methylene chloride has virtually no deleterious effect on the rubber compounds of the tire.

In addition to a protective-coating forming polymer, such puncture sealing and tire inflating compositions of the invention also preferably contain a fibrous plugging/matting agent and a methylene-chloride-soluble vulcanizing synthetic rubber for plugging punctures in the tire. A portion of the fibrous plugging/matting agent generally becomes bound in the protective coating formed from the protective-coating forming polymer in the composition.

The tire inflating and puncture sealing composition of the invention which includes a protective-coating-forming polymer need not contain water to emulsify methylene chloride. Such compositions may be anhydrous, which can reduce or eliminate the need for a corrosion inhibitor in the composition.

Basic Parameters of the Invention

The surfactant of the methylene-chloride-in-water composition of the invention preferably has a hydrophilic-to-lipophilic balance parameter of about 16 or greater, with a hydrophilic-to-lipophilic balance parameter of about 18 being particularly preferred.

Preferred surfactants together with the latex particles from the latex emulsion and the fibrous particles from the plugging/matting agent tend to keep methylene chloride trapped inside the methylene-chloride-in-water emulsion of the compositions of the invention. As the temperature increases or the pressure decreases inside a tire cavity, methylene chloride in the form of a gas will tend to evaporate from the emulsion. As the temperature decreases or pressure increases, microdroplets of methylene chloride will tend to be condensed from the atmosphere inside the tire cavity, and because of the relative high weight density of the droplets and the molecular attraction of the high hydrophilic to lipophilic balance emulsion system, the microdroplets will tend to be rapidly encapsulated back into the methylene-chloride-in-water emulsion, which tends to keep the rubber compounds of the tire and the soft latex coating which is formed by the composition protected from liquid methylene chloride.

Preferred puncture sealing and inflating compositions of the invention include a latex emulsion which, as it dries, tends to cure or vulcanize to a soft rubbery film on inside surfaces of the tire cavity and in any puncture hole in the tire. Preferably, the latex emulsion is a synthetic nitrile latex emulsion with a particle size distribution with particles in the range of from roughly 800 to roughly 3000 Å in diameter. More preferably, the synthetic latex emulsion has an average particle size of roughly 1700 Å. Preferably, the nitrile latex emulsion is an ABS polymer latex emulsion with a solids content in the range of from about 1 to about 8 percent by weight. A particularly preferred latex emulsion is commercially available under the trade name "Hycar" nitrile latex emulsion 1578×1 from B.F. Goodrich Company of Cleveland, Ohio.

Preferred protective-coating forming polymers which are weakly soluble in methylene chloride include "Nipol 1072 CG," a nitrile polymer commercially available from Zeon Chemicals, Inc. of Rolling Meadows, Ill., and "Arlatex 43 DA," a styrene-butadiene copolymer commercially available from C.L. Puskas Co. of Akron, Ohio. Preferably, a protective-coating forming polymer is present in a preferred puncture sealing and tire inflating composition of the invention in a concentration in a range of from about 0.5 to about 1.0 weight percent.

A preferred vulcanizing synthetic rubber which is soluble in methylene chloride is "KR-01," a styrene-butadiene synthetic rubber commercially available from A. Schulman of Akron, Ohio. The ratio of styrene to butadiene in "KR-01" is approximately 70 to 30. Preferably, a methylene-chloride-soluble vulcanizing synthetic rubber is present in a preferred puncture sealing and tire inflating composition of the invention in a concentration in a range of from about 1.0 to about 2.0 weight percent.

A particularly preferred fibrous plugging/matting agent for the tire sealing and inflating composition of the invention is an α-cellulose fiber filter aid having an average fiber length of about 700 μm. Preferably, the α-cellulose fiber filter aid is present in the composition at a concentration in the range of from about 0.2 to about 1.2 weight percent.

Preferably, the tire sealer and inflator composition of the invention includes a corrosion inhibitor—especially a corrosion inhibitor for ferrous, aluminum, brass and copper metals. A particularly prepared corrosion inhibitor is "Mazon RI-6," a surface active corrosion inhibitor commercially available from PPG Industries, Inc. of Gurnee, Ill.

Even when a tire inflated using a preferred puncture sealing and inflating composition of the invention has not been rotated, a large percentage—perhaps 90 percent or more—of the inside surface of the tire is ordinarily contacted by the water/out emulsion of the composition. The water/out emulsion contains a curable latex and the fibrous plugging/matting agent. The latex and the plugging/matting agent slowly form a soft rubbery film inside of the tire cavity. Rotation of the tire as the latex cures tends to cause the soft rubbery film to form over essentially the entire inner surface of the tire cavity, which tends to ensure that the puncture will be plugged wherever it is located.

Latex emulsions containing nitrile, acrylamide, acrylonitrile, butadiene, styrene, polyacrylate, epichlorohydrin, polyurethane, and polyvinyl chloride are considered environmental hazards and generally should not be permitted to enter ground water or waterways. The use of a fibrous plugging/matting agent in the tire sealing and inflating composition of the invention tends to prevent such materials from escaping through puncture holes in tires. In preferred tire sealing and inflating compositions of the invention, puncture holes in the tire of up to roughly 3/16 inch in diameter—or even greater—can be plugged. The latex materials tend to remain in the tire and gradually attach to inside tire surfaces. Eventually the tire with the cured latex materials inside can be disposed of properly by a hazardous waste disposer for automobile tires.

In the table and examples below, the following abbreviations and trade names are used.

"Hycar" nitrile latex emulsion 1578×1 is an ABS emulsion 20-polymer containing about 50 percent water and about 48–50 percent of a nitrile polymer which is commercially available from B.F. Goodrich Company of Cleveland, Ohio. The latex emulsion also contains roughly two percent of an anionic surfactant soap.

"KR-01" is a styrene-butadiene synthetic rubber commercially available from A. Schulman Inc. of Akron, Ohio.

"Arlatex 43 DA" is a styrene-butadiene copolymer commercially available from C.L. Puskas Co. of Akron, Ohio.

IGEPAL CA-897 is an octylphenoxypoly(ethylenoxy) ethanol surfactant commercially available from Rhone-Poulenc of Cranbury, N.J.

The designation "Mazon RI6" is a trade name of a surface active corrosion inhibitor commercially available from PPG Industries, Inc. of Gurnee, Ill. A suitable range for the surface acting corrosion inhibitor is from about 0.2 to about 1.5 weight percent.

The designation "Epoxol 9-5" is a trade name of epoxidized triglyceride commercially available from Swift Edible Oil Co. The epoxidized triglyceride contains a minimum of about 11 percent oxirane groups and can function as an acid scavenger.

The designation "Fibra-Cel SW-10" is a trade name of an α-cellulose fiber filter aid commercially available from Celite Corporation of Lompoc, Calif. The "Fibra-Cel SW-10" filter aid has an average fiber length of about 700 μm, is approximately 80 percent retained by a +400 mesh sieve and has a density of about 2.4 lbs/ft³. A suitable for the α-cellulose fiber filler is from about 0.4 to about 1.5 weight percent.

Preferably, containers of tire sealing and inflating composition of the invention contain from about 16 to about 40 gms of carbon dioxide.

Tire sealing and inflating compositions with the ingredients listed in the table below in the concentration ranges given are preferred:

| Ingredient | Approximate range parts by weight |
| --- | --- |
| Deionized water | 0.0–74.2 |
| "Hycar" nitrile latex emulsion 1578×1 | 2.0–30.0 |
| IGEPAL CA-897 | 0.3–7.0 |
| "Mazon RI-6" | 0.1–0.5 |
| Triethanolamine (99%) | 0.1–1.0 |
| "Epoxol 9-5" | 0.0–1.0 |
| "Fibra-Cel SW-10" | 0.1–2.0 |
| Methylene chloride | 30.0–76.0 |
| Other solvents | 0.0–15.0 |
| $SF_6$ | 0.0–7.5 |
| $CO_2$ | 2.8–8.7. |

As noted above, the "Hycar" ABS emulsion is about 48–50% polymer, so that the weight percent of the polymer is 1–15% (one half of the above weight of the emulsion).

EXAMPLES

Emulsion compositions were prepared in the following Examples using a laboratory blender available from John Oster Manufacturing Company of Milwaukee, Wis. under the trade name "Osterizer Cycle Blend Model 847." The blending referred to in each of the Examples may be carried out substantially as follows. Add the ingredients listed in the Example from the first ingredient, deionized water, through the fibrous plugging/matting agent ingredient "Fibra-Cel SW-10" to the blender. Then begin blending with the blender set on low speed. Increase the speed of the blender stepwise to the "mix" setting. Blend for about three minutes at the "mix" setting. Add the solvent or solvents rapidly while blending at the "mix" setting. When all solvents have been added, close the cover of the blender and blend for about three minutes to form an emulsion composition. Add the desired quantity of the emulsion composition to an aerosol container. Place a valve in the aerosol container and crimp into place. Pressurize the aerosol container with $CO_2$ or $SF_6$, or a combination of the two, using a gasser/shaker machine to an equilibration pressure in the aerosol unit of about 110 psig at approximately 70° F. Suitable gasser/shaker machines are available commercially from Terco, Inc. of Schaumburg, Ill. and BWI-KP Aerofil of Davenport, Iowa.

Example No. 1

| Ingredient | Approximate Parts By Weight |
| --- | --- |
| Deionized water | 31.022 |
| "Hycar" nitrile latex emulsion 1578x1 | 7.174 |
| IGEPAL CA-897 | 1.739 |
| Triethanolamine (99%) | .500 |
| "Mazon RI-6" | .300 |
| "Epoxol 9-5" | .300 |
| "Fibra-Cel SW-10" | .587 |
| Methylene chloride | 54.378 |
| $CO_2$ | 4.000 |

The ingredients were blended substantially according to the procedure set forth above to produce an emulsion composition. An aerosol container was charged with the emulsion composition and with carbon dioxide as set forth above. The charge of emulsion composition and carbon dioxide totalled about 16 oz in weight.

The emulsion was stable at temperatures in the range of from about −50° F. to about 200° F. Over the temperature range of from −50° to about 200° F., the pressure ranged from approximately 0 to approximately 300 psi.

The composition of Example 1 is nonflammable, nonexplosive, and non-stratospheric-ozone depleting. The composition does not contribute to global warming to an extent significantly greater than carbon dioxide alone and does not include any ingredient classified as an atmosphere polluting volatile organic compound by the State of California.

When the methylene-chloride containing emulsion composition of Example 1 was placed into contact with an inside surface of a rubber tire for thirty days during which time the time was driven approximately 1500 miles, the inside tire surface gave no evidence of attack by the composition.

To test the tire sealing capabilities of the emulsion composition, a 205×75×15" size tire mounted on an automotive vehicle was punctured with a 20p nail. The nail was removed and the tire allowed to go flat to the street surface. The aerosol unit containing the approximately 16 oz avoirdupois charge of emulsion composition and carbon dioxide was connected to the valve of the flat tire and the charge allowed to flow and expand into the tire. The outside air temperature was between about 60° F. and about 80° F. The rim lifted off the street surface one to three inches. The vehicle was then driven one mile. The puncture hole was effectively sealed on the first revolution of the tire. The tire pressure after the tire had been driven one mile was about 11 psig. At the end of approximately five miles, the tire pressure was about 13 psig, and at the end of approximately ten miles, the tire pressure was about 15 psig. After the vehicle had been driven for about 103 miles at an average speed of about 65 mph, the tire pressure was measured and found to have remained at about 15 psig. The test tire was then pressurized with-air to approximately 30 psig. The tire pressure was then rechecked after a drive of about 50 miles. The tire pressure had dropped to about 23 psig, showing an increased solubility of $CO_2$ in the emulsion composition at the increased pressure. The test tire was then repressurized to approximately 30 psig. After 30 days and approximately 1500 miles, the pressure was found to be holding constant at about 28 psig. A similar tire driven on a laboratory spinner for 12 months held an essentially constant pressure of approximately 28 psig.

Example No. 2

| Ingredient | Approximate Parts By Weight |
| --- | --- |
| Deionized water | 30.550 |
| "Hycar" nitrile latex emulsion 1578x1 | 7.174 |
| IGEPAL CA-897 | 1.739 |
| Triethanolamine (99%) | .500 |
| "Mazon RI-6" | .300 |
| "Epoxol 9-5" | .300 |
| "Fibra-Cel SW-10" | .587 |
| Methylal | 11.000 |
| Methylene chloride | 43.500 |
| $CO_2$ | 4.350 |

The ingredients listed above were blended substantially according to the procedure set forth above to form an emulsion composition. The emulsion composition was introduced into an aerosol container which was then charged with $CO_2$ to approximately 110 psig at about 70° C. in substantially the manner described above.

The composition of Example 2 is only marginally flammable, essentially nonexplosive, and essentially non-stratospheric-ozone depleting. The composition contributes to an increase in global warming to an extent only very slightly greater than carbon dioxide and contains only about eleven percent by weight of compounds which have been classified by the State of California as atmospheric polluting volatile organic compounds.

The composition of Example 2 was discharged from the aerosol container into a second tire which had been punctured with a 20p nail on the same vehicle as the tire of Example 1. Pressures were measured for the two tires at essentially the same times. The results for the formula of Example 2 were substantially the same as for the formula of Example 1, with the exception that the tire pressure ranged from about 10.5 psig after approximately one mile of driving to about 15.5 psig after approximately ten miles of driving. The pressure in the tire charged with the formula of Example 2 showed a greater variation with temperature than did the pressure in the tire charged with the formula of Example 1. This test tire held substantially constant pressure at about 29 psig after 30 days and approximately 1500 miles of driving.

Example No. 3

| Ingredient | Approximate Parts By Weight |
| --- | --- |
| Deionized water | 30.600 |
| "Hycar" nitrile latex emulsion 1578x1 | 7.174 |
| IGEPAL CA-897 | 1.739 |
| Triethanolamine (99%) | .500 |
| "Mazon RI-6" | .300 |
| "Epoxol 9-5" | .300 |
| "Fibra-Cel SW-10" | .587 |
| Acetone | 11.000 |
| Methylene chloride | 43.500 |
| $CO_2$ | 4.350 |

The ingredients listed above were blended and charged into an aerosol container substantially as described above. Results obtained from the stability study were essentially the same as those obtained with the emulsion compositions of Examples 1 and 2. Tire pressures were the substantially same as those found for the emulsion composition of Example 2.

The composition of Example 3 is only marginally flammable, essentially nonexplosive, and essentially nonstratospheric-ozone depleting. The composition contributes to an increase in global warming to an extent only slightly greater than carbon dioxide and contains only about eleven percent by weight of compounds which have been classified by the State of California as atmospheric polluting volatile organic compounds.

Example No. 4

| Ingredient | Approximate Parts By Weight |
|---|---|
| Deionized water | 19.770 |
| "Hycar" nitrile latex emulsion 1578x1 | 7.174 |
| IGEPAL CA-897 | 1.739 |
| "Mazon RI-6" | .300 |
| Triethanolamine (99%) | .500 |
| "Epoxol 9-5" | .300 |
| "Fibra-Cel SW-10" | .587 |
| Methylene chloride | 65.217 |
| $CO_2$ | 5.000 |

The ingredients listed above were blended substantially according to the procedure set forth above and charged into an aerosol container as described.

The composition of Example 4 is nonflammable, nonexplosive, and non-stratospheric-ozone depleting. The composition does not contribute to global warming to an extent significantly greater than carbon dioxide alone and does not include any ingredient classified as an atmosphere polluting volatile organic compound by the State of California.

A 205x75x15" tire was attached to a laboratory tire spinner set to turn at approximately 30 rpm. The valve core was removed to depressurize the tire. After reinstalling the valve core, an aerosol unit containing about 16 oz avoirdupois was attached to the valve and the valve fully actuated. The unit took approximately 50 seconds to discharge into the tire. The aerosol unit was then disconnected. The tire was spun approximately one minute and then the pressure was checked. The pressure in the tire was approximately 11 psig at ambient temperature.

Example No. 5

| Ingredient | Approximate Parts By Weight |
|---|---|
| Deionized water | 35.480 |
| "Hycar" nitrile latex emulsion 1578x1 | 7.174 |
| IGEPAL CA-897 | 1.739 |
| "Mazon RI-6" | .300 |
| Triethanolamine (99%) | .500 |
| "Epoxol 9-5" | .300 |
| "Fibra-Cel SW-10" | .587 |
| Methylene chloride | 60.000 |
| $SF_6$ | 3.920 |

The ingredients were blended and the resulting emulsion composition tested substantially as described in Example 4. The pressure in the tire was about 8 psig.

The composition of Example 5 is nonflammable, nonexplosive, and non-stratospheric-ozone depleting. The composition has the potential to contribute to global warming to an extent somewhat greater than carbon dioxide alone. The composition does not include any ingredient classified as an atmosphere polluting volatile organic compound by the State of California.

Example No. 6

| Ingredient | Approximate Parts By Weight |
|---|---|
| Deionized water | 24.810 |
| "Hycar" nitrile latex emulsion 1578x1 | 7.174 |
| IGEPAL CA-897 | 1.739 |
| "Mazon RI-6" | .300 |
| Triethanolamine (99%) | .500 |
| "Epoxol 9-5" | .300 |
| "Fibra-Cel SW-10" | .987 |
| Methylene chloride | 60.000 |
| $SF_6$ | 1.220 |
| $CO_2$ | 3.370 |

The ingredients listed above were blended and the resulting emulsion composition tested as described in Example 4. The pressure in the tire was found to be approximately 9 psig.

The composition of Example 6 is nonflammable, nonexplosive, and non-stratospheric-ozone depleting. The composition has the potential to contribute to global warming to a somewhat greater extent than carbon dioxide alone. The composition does not include any ingredient classified as an atmosphere polluting volatile organic compound by the State of California.

Example No. 7

| Ingredient | Approximate Parts By Weight |
|---|---|
| Deionized water | 20.660 |
| "Hycar" nitrile latex emulsion 1578x1 | 7.174 |
| IGEPAL CA-897 | 1.739 |
| "Mazon RI-6" | .300 |
| Triethanolamine (99%) | .900 |
| "Epoxol 9-5" | .300 |
| "Fibra-Cel SW-10" | .587 |
| 1,1,2,Trichloroethylene | 65.220 |
| $CO_2$ | 3.520 |

The ingredients listed above were blended and the resulting emulsion composition tested as described in Example 4. The pressure in the tire was found to be approximately 7 psig.

The composition of Example 7 is nonflammable, nonexplosive, and non-stratospheric-ozone depleting. The composition has the potential to contribute to an increase in global warming to an extent significantly greater than carbon dioxide and contains about 65.22 percent by weight of compounds which have been classified by the State of California as atmospheric polluting volatile organic compounds.

Example No. 8

| Ingredient | Approximate Parts By Weight |
|---|---|
| Deionized water | 30.704 |
| "Hycar" nitrile latex emulsion 1578x1 | 7.174 |
| IGEPAL CA-897 | 1.739 |
| Triethanolamine (99%) | .500 |
| "Mazon RI-6" | .300 |
| "Epoxol 9-5" | .300 |
| "Fibra-Cel SW-10" | .587 |
| Furan | 10.870 |

-continued

| Ingredient | Approximate Parts By Weight |
| --- | --- |
| Methylene chloride | 43.478 |
| CO$_2$ | 4.348 |

The ingredients listed above were blended substantially according to procedure described above. An aerosol unit was filled to a total contents weight including CO$_2$ of about 460 gms. The average quantity expelled from the aerosol unit into a deflated 205×75×15" tire was found to be about 450 gms. Using the test procedure set forth in Example 4, the pressure in the tire was about 11 psig at approximately 70°–72° F.

The composition of Example 8 is only marginally flammable, essentially nonexplosive, and non-stratospheric-ozone depleting. The composition has the potential to contribute to an increase in global warming to a somewhat greater extent than carbon dioxide and contains only about 10.87 percent by weight of compounds which have been classified by the State of California as atmospheric polluting volatile organic compounds.

Example No. 9

| Ingredient | Approximate Parts By Weight |
| --- | --- |
| Deionized water | 42.118 |
| "Hycar" nitrile latex emulsion 1578x1 | 7.174 |
| IGEPAL CA-897 | 1.739 |
| Triethanolamine (99%) | .500 |
| "Mazon RI-6" | .300 |
| "Epoxol 9-5" | .300 |
| "Fibra-Cel SW-10" | .587 |
| Methylene chloride | 43.478 |
| CO$_2$ | 3.804 |

The ingredients listed above were blended substantially according to procedure described above. An aerosol unit was filled to a total contents weight including CO$_2$ of about 460 gms. The average quantity expelled from the aerosol unit into a deflated 205×75×15" tire was found to be about 450 gms. Using the test procedure .set forth in Example 4, the pressure in the tire was about 9 psig at approximately 70°–72° F.

The composition of Example 9 is nonflammable, nonexplosive, and non-stratospheric-ozone depleting. The composition does not contribute to global warming to an extent significantly greater than carbon dioxide alone and does not include any ingredient classified as an atmosphere polluting volatile organic compound by the State of California.

Example No. 10

| Ingredient | Approximate Parts By Weight |
| --- | --- |
| Deionized water | 30.704 |
| "Hycar" nitrile latex emulsion 1578x1 | 7.174 |
| IGEPAL CA-897 | 1.739 |
| Triethanolamine (99%) | .500 |
| "Mazon RI-6" | .300 |
| "Epoxol 9-5" | .300 |
| "Fibra-Cel SW-10" | .587 |
| 1,1-dichloro-1-fluoroethane (G-141b) | 10.870 |
| Methylene chloride | 43.478 |
| CO$_2$ | 4.022 |

The ingredients listed were blended substantially according to the procedure set forth above. An aerosol unit was filled to a total contents weight including CO$_2$ of about 460 gms. Using the test procedure set forth in Example 4, the pressure in the tire was found to be approximately 11 psig at about 70°–72° F.

The composition of Example 10 is essentially nonflammable, essentially nonexplosive, and has only a slight potential for non-stratospheric-ozone depletion. The composition has the potential to contribute to global warming to an extent greater than carbon dioxide alone and includes 1,1-dichloro-1-fluoroethane which has been classified as an atmosphere polluting volatile organic compound by the State of California.

In the following examples Nos. 11 through 26, tire pressurization tests were conducted with a 215×70×15" tire mounted on a 1993 Lincoln Town Car. For one of the tires of the car, the following data give the approximate height of a rim of the tire above an essentially flat roadway on which the car rested as a function of the pressure in the tire.

1. Tire mounted on left or right rear:

.75" ≈ 0 psig
1.25" ≈ 2 psig
1.75" ≈ 4 psig
2.25" ≈ 6 psig
2.75" ≈ 8 psig
3.25" ≈ 11 psig
3.75" ≈ 17 psig
4.25" ≈ 29 psig
4.4375" ≈ 35 psig 2. Tire mounted on left or right front:

.625" ≈ 0 psig
.75" ≈ 2 psig
1.25" ≈ 3 psig
1.75" ≈ 5 psig
2.25" ≈ 7.5 psig
2.75" ≈ 10 psig
3.25" ≈ 15 psig
3.75" ≈ 23 psig
4.125" ≈ 35 psig.

In order to drive the vehicle at 20 to 30 mph, the rim must be at least about 1.25" off a roadway surface. About 25 gms of CO$_2$ is required to lift the rim of a front tire on the "Lincoln Town Car" approximately 1.25 inch at a temperature of approximately 20° F., without the aid of low to high-vapor-pressure producing solvents.

Approximately 19 gms of CO$_2$ is required to lift the rim of a rear tire 1.25 inch off a flat surface under essentially the same conditions. For the compositions of the examples below, the tire pressure generally increased between roughly four and five psig upon driving the first mile after introduction of the composition into a tire.

Example No. 11

| Ingredient | Approximate Parts By Weight |
|---|---|
| Deionized Water | 27.310 |
| "Hycar" nitrile latex emulsion 1578x1 | 7.174 |
| IGEPAL CA-897 | 1.739 |
| Triethanolamine (99%) | .500 |
| "Mazon RI-6" | .300 |
| "Fibra-Cel SW-10" | .587 |
| Ethylene Glycol | 8.695 |
| Methyl Acetate | 5.435 |
| Methylene Chloride | 43.478 |
| $CO_2$ | 4.782 |

The ingredients listed above were blended substantially as described above to form an emulsion. Ethylene glycol was included in the emulsion composition to protect the emulsion from freezing and obtain accurate pressure measurements.

Methyl acetate at less than approximately seven percent in this formula is essentially non-flammable and non-explosive at standard atmospheric oxygen concentration and one atmosphere pressure. Methyl acetate has a relatively high solubility rate for $CO_2$ and a vapor pressure of about 220 mbar at 68° F. temperature.

A charge of approximately 460 gm of the emulsion composition—including approximately 22 gm $CO_2$—was introduced into a Department of Transportation 211×713 "2Q" aerosol container. The approximate pressure of the composition in the container at various temperatures are set forth below:

| Pressure v. Temperature |
|---|
| 7° F. ≈ 84 psig |
| 35° F. ≈ 88 psig |
| 70° F. ≈ 110 psig |
| 130° F. ≈ 180 psig. |

The composition of Example No. 11 was tested in a 215×70×15" tire mounted as a rear tire of a "Lincoln Town Car." The 211×713 aerosol container was connected to the valve of the tire and the charge of emulsion composition in the container allowed to discharge into the tire. The tire was raised about 2.5 inches off a flat surface, with a pressure of approximately 7 psig at about 40° F. temperature. After having been driven one mile at speeds in the range of from about 25 to about 30 mph, the tire pressure increased to about 11 psig.

Examples Nos. 12 and 13

| Ingredient | Approximate Parts By Weight | |
|---|---|---|
| | Ex. No. 12 | Ex. No. 13 |
| Deionized Water | 23.747 | 23.313 |
| "Hycar" nitrile latex emulsion 1578x1 | 7.174 | 7.174 |
| IGEAL CA-897 | 1.739 | 1.739 |
| Triethanolamine (99%) | .500 | .500 |
| "Mazon RI-6" | .300 | .300 |
| "Epoxol 9-5" | .300 | .300 |
| "Fibra-Cel SW-10" | .587 | .587 |
| Ethylene Glycol | 6.522 | 6.522 |
| Methylene Chloride | 54.348 | 54.348 |
| $CO_2$ | 4.783 | 5.217 |

The ingredients were blended substantially as described above to form an emulsion. Ethylene glycol was included in the emulsion compositions to protect the emulsion from freezing and obtain accurate pressure measurements.

For each of the compositions of Examples Nos. 12 and 13, a charge weighing approximately 460 gms of the composition was packaged in a 211×713 aerosol container. The charge of the composition of Example No. 12 contained about 22 gms of $CO_2$. The charge of the composition of Example No. 13 contained about 24 gms of $CO_2$. The approximate pressure in the containers containing the respective charges of the two compositions at various temperatures are set forth below.

| Pressure v. Temperature | | |
|---|---|---|
| | Ex. No. 12 | Ex. No. 13 |
| 7° F. ≈ | 71 psig | 86 psig |
| 35° F. ≈ | 79 psig | 88 psig |
| 68° F. ≈ | 110 psig | 120 psig |
| 130° F. ≈ | 180 psig | 200 psig. |

The formula in Example No. 12 requires the use of a container which meets or exceeds the specifications of the United States Department of Transportation for a "2Q" aerosol container. The specification for a Department of Transportation "2Q" container limits the maximum pressure at a temperature of 130° F. to 180 psig.

The formula in Example No. 13 requires the use of a container which meets or exceeds the specifications of the United States Department of Transportation for an "E 10232" aerosol container. The specification for a Department of Transportation "E 10232" container limits the maximum pressure at a temperature of 130° F. to 200 psig.

The emulsion composition of Example No. 12 was tested in the rear tire—size 215×70×15"—of a "Lincoln Town Car," with following test results: the rim of the tire raised about 2.5" from a flat surface with approximately 7 lbs. pressure at about 40° F. The pressure increased to approximately 11 lbs. after having been driven one mile after the composition had been introduced into the tire.

Examples Nos. 14, 15, 16 and 17

| Ingredient | Approximate Parts by Weight | | | |
|---|---|---|---|---|
| Example No. | 14 | 15 | 16 | 17 |
| Deionized Water | 20.524 | 19.947 | 17.498 | 14.587 |
| "Hycar" nitrile latex emulsion 1578x1 | 7.174 | 7.174 | 7.174 | 7.174 |
| IGEPAL CA-897 | 1.739 | 1.739 | 1.739 | 1.739 |
| Triethanolamine (99%) | .500 | .500 | .500 | .500 |
| "Mazon RI-6" | .300 | .300 | .300 | .300 |
| "Epoxol 9-5" | .300 | .300 | .300 | .300 |
| "Fibra-Cel SW-10" | .587 | .587 | .587 | .587 |
| Ethylene Glycol | 6.052 | 6.052 | 6.052 | 6.052 |
| Methylene chloride | 57.637 | 57.637 | 57.637 | 57.637 |

-continued

| Ingredient | Approximate Parts by Weight | | | |
|---|---|---|---|---|
| Example No. | 14 | 15 | 16 | 17 |
| $CO_2$ | 5.187 | 5.764 | 8.213 | — |
| $SF_6$ | — | — | — | 11.124 |

Ethylene glycol was added to protect emulsion from freezing to obtain accurate pressures.

The emulsions of Examples 14, 15, 16 and 17 were all packaged in a 211×604 aerosol container with a total fill of approximately 347 gms. The aerosol container for Example No. 14 contained about 18 gms of $CO_2$; that for Example No. 15 contained about 20 gms of $CO_2$; and that for Example No. 16 contained about 28.5 gms of $CO_2$. The aerosol container for Example No. 17 contained about 38.6 gms of $SF_6$ The pressure in psig in the various containers as a function of temperature are given in the following table:

| Example No. | 14 | 15 | 16 | 17 |
|---|---|---|---|---|
| 7° F. ≈ | 71 | 84 | 122 | 120 |
| 35° F. ≈ | 79 | 88 | 127 | — |
| 39° F. ≈ | — | — | — | 180 |
| 68° F. ≈ | 112 | 120 | 179 | 205 |
| 180° F. ≈ | 180 | 200 | 278 | 255. |

The emulsion composition of Example No. 14 requires packaging in an aerosol container which meets or exceeds the specification for a Department of Transportation "2Q" container. The emulsion composition of Example No. 15 requires packaging in an aerosol container which meets or exceeds the specifications for a Department of Transportation "E 10232" aerosol container. The emulsion compositions of Example Nos. 16 and 17 require packaging in an aerosol container which meets or exceeds the specifications for a Department of Transportation "E 9393 NRC 240/300" aerosol container.

The Department of Transportation E 9393 specification for aerosol containers limits the maximum pressure at 130° F. temperature to 300 psig. The table below sets forth the pressure in a 211×604 aerosol container which meets the Department of Transportation E 9393 specification charged when empty with approximately 19 gms of $CO_2$:

| Pressure v. Temperature |
|---|
| 7° F. ≈ 220 psig |
| 37° F. ≈ 236 psig |
| 69° F. ≈ 255 psig |
| 130° F. ≈ 292 psig. |

The results above demonstrate that the maximum quantity of $CO_2$ which can be contained in an aerosol container of the 211×604 size and meet the Department of Transportation E 9393 specification is about 19 gms. Similarly, the maximum quantity of $CO_2$ which an empty aerosol container of the 211×713 size can contain and meet the Department of Transportation E 9393 specification is approximately 24 gms. The minimum quantity of liquid-formula tire sealant to fully wet the inside of 215×70×15" tire with sufficient surplus to seal a 3/16" puncture hole is in the range of from about 100 to about 120 ml.

Examples Nos. 18, 19 and 20

| Ingredient | Approximate Parts by weight | | |
|---|---|---|---|
| Example No. | 18 | 19 | 20 |
| Deionized Water | 42.028 | 41.661 | 40.425 |
| "Hycar" nitrile latex emulsion 1578x1 | 24.247 | 24.035 | 23.321 |
| IGEPAL CA-897 | .367 | .364 | .353 |
| Triethanolamine (99%) | .785 | .728 | .707 |
| "Mazon RI-6" | .588 | .588 | .565 |
| "Epoxol 9-5" | .367 | .364 | .353 |
| "Fibra-Cel SW-10" | 1.469 | 1.457 | 1.413 |
| Ethylene Glycol | 18.369 | 18.208 | 17.668 |
| $CO_2$ | 11.830 | 12.600 | 15.195 |

Ethylene glycol was added to protect emulsion from freezing to obtain accurate pressures.

The emulsion formulas of Examples Nos. 18 and 19 were packaged in aerosol containers of the 211×604 size which met the Department of Transportation specification E 9393. The container for Example No. 18 was filled with approximately 136.1 gms composition, of which about 16.1 gms was $CO_2$. The container for Example No. 19 was filled with approximately 137.3 gms composition, of which about 17.3 gms was $CO_2$. The pressure in psig in the various containers as a function of temperature are given in the following table:

Pressure v. Temperature

| Example No. | 18 | 19 | 20 |
|---|---|---|---|
| 7° F. ≈ | 164 | 180 | 178 |
| 39° F. ≈ | 200 | 216 | 214 |
| 70° F. ≈ | 229 | 245 | 243 |
| 130° F. ≈ | 276 | 292 | 290. |

The water-latex emulsion system of Examples Nos. 18, 19, and 20 dissolves less $CO_2$ at any pressure than can be compressed into the headspace of the container, which demonstrates the advisability of using a minimum quantity of sealant in order to maximize the quantity of $CO_2$ pressurant.

The 211×604 aerosol containers of tire sealant composition of Examples Nos. 18 and 19 will generally seal a 3/16" puncture in a tire and inflate the tire sufficiently to lift the rim of the tire off a flat surface for standard tires of sizes that fit 12", 13", and most 14" rims. The 211×713 aerosol container of tire sealant composition of Example No. 20 will generally seal a puncture in a tire and inflate the tire sufficiently to lift the rim off a flat surface for standard tires of sizes that fit 12", 13", 14", and some 15" rims.

Examples Nos. 21, 22 and 23

| Ingredient | Approximate Parts By Weight | | |
|---|---|---|---|
| Example No. | 21 | 22 | 23 |
| Methylene Chloride | 79.082 | 78.569 | 88.300 |
| "KR-01" styrene-butadiene | 2.000 | 2.000 | 2.000 |
| "Arlatex 43 DA" | 1.000 | 1.000 | 1.000 |
| Triethanolamine (95%) | .347 | .345 | .300 |

-continued

| Ingredient | Approximate Parts By Weight | | |
|---|---|---|---|
| Example No. | 21 | 22 | 23 |
| "Mazon RI-6" | .347 | .345 | .300 |
| "Fibra-Cel SW-10" | .500 | .500 | .500 |
| $CO_2$ | 16.724 | 17.241 | 7.600 |

The compositions of Example Nos. 21, 22 and 23 may be prepared as set forth below. Weigh or tare an empty blending vessel, then add methylene chloride to the blending vessel with weighing to the specified weight. Set the stir speed of the blender to produce a medium agitation of the methylene chloride in the blending vessel. The blending vessel should be kept tightly closed, if possible. Add the specified weight of "KR-01" and "Arlatex 43 DA" polymers. Continue to stir until the polymers are dissolved, approximately one hour, then weigh and add the specified quantity of each remaining ingredient in the table above through "Fibra-Cel SW-10." Continue to stir at medium to fast agitation for about 80 minutes. Then weigh and, if needed, add additional methylene chloride to compensate for blending losses. The blending vessel should then be sealed. The resulting mixture may be filtered and pumped to aerosol container filling equipment. To fill an aerosol container, a specified quantity of the mixture is added to the container, and an aerosol valve is placed into the container and crimped to form a seal. The aerosol container may then be pressurized with $CO_2$ or $SF_6$. Preferably, for safety and fill-weight control, the aerosol container may be pressurized using a gasser/shaker type machine.

The compositions of Examples Nos. 21 and 22 were packaged respectively into aerosol containers of 211×604 size which met the Department of Transportation "E 9393" specification. The container for Example No. 21 was filled with approximately 144 gms, of which about 24 gms was $CO_2$. The aerosol container for Example No. 22 was filled with approximately 145 gms, of which about 25 gms was $CO_2$. The composition of Example No. 23 was packaged into a "2Q" pressure rated, 211×604 size aerosol container. The aerosol container for Example No. 23 was filled with about 330 gms of which about 25 gms was $CO_2$. The pressure in the respective aerosol containers as a function of temperature are given in the following table:

| Example No. | 21 | 22 | 23 |
|---|---|---|---|
| 7° F. ≈ | 124 psig | 124 psig | — |
| 39° F. ≈ | 142 psig | 153 psig | 83 psig |
| 70° F. ≈ | 190 psig | 198 psig | 120 psig |
| 130° F. ≈ | 280 psig | 283 psig | 180 psig. |

Example No. 22 was tested in a front tire of a 215×70×15" size "Lincoln Town Car." Upon introduction of the composition from the aerosol container into the tire, the rim of the tire was raised approximately 1.4375" from a flat surface. Approximately lbs. of pressure was developed in the tire at 30° F. temperature. Some pressure was lost in transferring the composition to the tire. The pressure in the tire increased to approximately lbs. after driving about one mile.

Examples Nos. 24. 25. and 26

| Ingredient | Approximate Parts by weight | | |
|---|---|---|---|
| Example No. | 24 | 25 | 26 |
| Methylene chloride | 65.264 | — | — |
| 1,1,2 Trichloroethylene | — | 71.687 | 83.489 |
| "KR-01" styrene-butadiene | 2.000 | 2.000 | 2.000 |
| "Arlatex 43-DA" | 1.000 | 1.000 | 1.000 |
| Triethanolamine (99%) | .300 | .300 | .300 |
| "Mazon RI-6" | .300 | .300 | .300 |
| "Fibra-Cel SW-10" | .500 | .500 | .500 |
| $CO_2$ | — | — | 7.683 |
| $SF_6$ | 30.636 | 24.213 | 4.728 |

A preferred blending procedure and packaging technique for the composition of Examples Nos. 24, 25, 26 is the same as discussed above for Examples Nos. 21, 22, and 23.

The Examples Nos. 24, 25 and 26 were packaged in 211×604 aerosol containers which met Department of Transportation specification "E 9393." The aerosol container for Example No. 24 was filled with approximately 173 gms of the composition of which about 53 gms was $SF_6$. The container for Example No. 25 was filled with approximately 206.5 gms of the composition of which about 50 gms was $SF_6$. The container for Example No. 26 was filled with approximately 236.9 gms of formula, of which about 18.2 gms was $CO_2$ and about 11.2 gms was $SF_6$. The pressure in psig in the various containers as a function of pressure is set forth in the following table:

| Example No. | 24 | 25 | 26 |
|---|---|---|---|
| 7° F. ≈ | 130 | 114 | 130 |
| 70° F. ≈ | 203 | 192 | 203 |
| 130° F. ≈ | 250 | 235 | 270. |

The filled aerosol container for Example No. 24 was tested with a rear-size 215×70×15" tire for a "Lincoln Town Car". Upon discharge of the contents of the container into the flat rear tire, the rim of the tire raised about 1.375" from a flat surface. A pressure of about 2.5 lbs. at approximately 58° F. temperature developed in the tire initially. The pressure in the tire increased to approximately 6 lbs after the tire had been driven one mile.

In general, the solubility of $CO_2$ and $SF_6$ is slightly higher in 1,1,1-trichloroethane than in 1,1,2 trichloroethylene. The solubility of $CO_2$ and $SF_6$ is generally slightly lower in perchloroethylene than in 1,1,2-trichloroethylene. Blends of these three chlorinated solvents, or blends with any of these three in combination with methylene chloride could be used in compositions such as those of Examples Nos. 24, 25 and 26. However, 1,1,1-trichloroethane, 1,1,2-trichloroethyleneandperchloroethylenehave some negative environmental aspects. All three are listed as volatile organic compounds "VOCs." 1,1,1-trichloroethane has been characterized as an ozone depletor. Perchloroethylen in ground water is thought to hydrolyze slowly to produce vinyl chloride, a suspected carcinogen.

It is not intended to limit the present invention to the specific embodiments described above. For example, the aerosol propellant of the invention may be employed as a propellant for compositions other than the tire sealing and inflating composition of the invention or tire sealing and inflating compositions in general. The composition of the invention may include ingredients in addition to those described above. It is recognized that these and other changes may be made in the compositions specifically described herein without departing from the scope and teachings of the instant invention, and it is intended to encompass all other embodiments, alternatives, and modifications consistent with the present invention.

What is claimed is:

1. A sealant and inflator composition comprising:
   (a) an ABS polymer latex emulsion phase and a discontinuous methylene chloride phase, the ABS latex emulsion having a solid content in the range of about 1 to about 8 percent by weight, the methylene chloride being present in a concentration in a range from about 30 to about 76 weight percent;
   (b) a compressed carbon dioxide gas propellant soluble at least to a limited extent in said two phases; in which the sealant and inflator composition is substantially free of ozone depleting organic compounds;
   (c) a polymer-emulsion-stabilizing surfactant of octylphenoxypoly (ethyleneoxy) ethanol with a hydrophilic-to-lipophilic balance greater than about 16;
   (d) an α-cellulose fiber filter aid present in a concentration in a range of from about 0.2 to about 1.2 weight percent; and
   (e) a surface acting corrosion inhibitor.

2. The sealant and inflator composition of claim 1, in which the surface active corrosion inhibitor is present in a concentration in a range of from about 0.2 to about 1.5 weight percent.

3. A puncture sealing and inflator composition for pneumatic tires comprising:
   (a) a blend of ABS polymers that are soluble to partially soluble in methylene chloride, present in a concentration range of from about 1 to about 15 weight percent;
   (b) an α-cellulose fiber filter aid present in a concentration range of from about 0.4 to about 1.5 weight percent;
   (c) methylene chloride;
   (d) compressed carbon dioxide present in an amount sufficient to at least partially inflate a tire; and
   (e) a surface acting corrosion inhibitor.

4. The puncture sealing and inflator composition of claim 3 in which the composition is substantially free of ozone depleting volatile organic compounds.

5. A puncture sealing and inflating composition for pneumatic tires comprising:
   (a) a methylene-chloride-in-water emulsion comprising water, methylene chloride, and a surfactant;
   (b) carbon dioxide as a propellant;
   (c) a curable ABS latex polymer emulsion;
   (d) a fibrous plugging/matting agent; and
   (e) a surface active corrosion inhibitor.

6. The puncture sealing and inflating composition of claim 5 in which a second propellant gas is selected from the group consisting of sulfur hexafluoride.

7. The puncture sealing and inflating composition of claim 7, in which the propellant gas consists of carbon dioxide.

8. The puncture sealing and inflating composition of claim 5 in which the surfactant has a hydrophilic-to-lipophilic balance in the direction of greater water solubility than oil solubility.

9. The puncture sealing and inflating composition of claim 8 in which the surfactant has a hydrophilic-to-lipophilic balance parameter of greater than about 16.

10. The puncture sealing and inflating composition of claim 9 in which the surfactant includes a blend of an octylphenoxypoly (ethyleneoxy) ethanol and sodium lauryl sulfate.

11. The puncture sealing and inflating composition of claim 6 in which the fibrous plugging/matting agent is a fibrous cellulosic material.

12. The puncture sealing and inflating composition of claim 11 in which the fibrous cellulosic plugging/matting agent is an α-cellulose fiber filter aid.

13. The puncture sealing and inflating composition of claim 12 in which the α-cellulose fiber filter aid has an average fiber length of about 700 μm.

14. The puncture sealing and inflating composition of claim 5 in which the composition is substantially free of atmosphere polluting volatile organic compounds.

15. The puncture sealing and inflating composition of claim 5 in which the surface active corrosion inhibitor is preset in a concentration range of from about 0.2 to about 1.5 weight percent.

* * * * *